United States Patent
You

(10) Patent No.: US 10,253,858 B2
(45) Date of Patent: Apr. 9, 2019

(54) CLEARANCE CONTROL SWASH PLATE DEVICE AND SINGLE-SHAFT TWO-SPEED DRIVE SYSTEM WITH FRICTION CLUTCH APPLIED THERETO

(71) Applicant: ETR CO., LTD., Hwaseong-si, Gyeonggi-do (KR)

(72) Inventor: Kwang Suk You, Suwon-Si (KR)

(73) Assignee: ETR CO., LTD. (KR)

( * ) Notice: Subject to any disclaimer, the term of this patent is extended or adjusted under 35 U.S.C. 154(b) by 28 days.

(21) Appl. No.: 15/641,310

(22) Filed: Jul. 4, 2017

(65) Prior Publication Data
US 2018/0328474 A1 Nov. 15, 2018

(30) Foreign Application Priority Data
May 10, 2017 (KR) ........................ 10-2017-0057912

(51) Int. Cl.
| | |
|---|---|
| B60K 17/16 | (2006.01) |
| F16D 13/52 | (2006.01) |
| F16D 23/04 | (2006.01) |
| F16D 23/02 | (2006.01) |
| F16H 57/10 | (2006.01) |

(Continued)

(52) U.S. Cl.
CPC .......... *F16H 37/082* (2013.01); *B60K 17/08* (2013.01); *B60K 17/16* (2013.01); *F16D 11/14* (2013.01); *F16D 13/52* (2013.01); *F16D 23/02* (2013.01); *F16D 23/04* (2013.01); *F16D 23/12* (2013.01); *F16H 3/54* (2013.01); *F16H 19/001* (2013.01); *F16H 57/10* (2013.01); *F16H 63/3003* (2013.01); *F16D 49/10* (2013.01); *F16D 2023/0625* (2013.01); *F16D 2023/123* (2013.01); *F16D 2125/42* (2013.01); *F16H 2200/0034* (2013.01); *F16H 2200/2005* (2013.01); *F16H 2200/2035* (2013.01)

(58) Field of Classification Search
None
See application file for complete search history.

(56) References Cited

U.S. PATENT DOCUMENTS

| | | | |
|---|---|---|---|
| 2004/0231946 A1* | 11/2004 | Neelakantan | F16D 23/12 |
| | | | 192/84.6 |
| 2018/0238402 A1* | 8/2018 | Saito | F16D 13/46 |

FOREIGN PATENT DOCUMENTS

| | | |
|---|---|---|
| JP | 6040572 B2 | 12/2016 |
| KR | 101378686 B1 | 3/2014 |

* cited by examiner

*Primary Examiner* — Jacob S. Scott
(74) *Attorney, Agent, or Firm* — Renaissance IP Law Group LLP

(57) ABSTRACT

Disclosed is a clearance control swash plate device for a transmission or reducer and a single-shaft two-speed drive system, including the clearance control swash plate device, with a friction clutch. The clearance control swash plate device includes: an action plate mounted on a power transfer shaft; a first thrust bearing disposed on the action plate, and configured to prevent rotation force, received from the action plate, from being transferred; a first clearance swash plate disposed on the first thrust bearing; a second clearance swash plate disposed on the first clearance swash plate; a worm engaged with a worm gear formed on the outer circumference of the second clearance swash plate; a second thrust bearing disposed on the second clearance swash plate, and configured to prevent rotation force, received from the second clearance swash plate, from being transferred; and a thrust washer disposed on the second thrust bearing.

9 Claims, 11 Drawing Sheets

(51) Int. Cl.
*F16D 23/12* (2006.01)
*F16H 37/08* (2006.01)
*F16D 11/14* (2006.01)
*B60K 17/08* (2006.01)
*F16H 3/54* (2006.01)
*F16H 19/00* (2006.01)
*F16H 63/30* (2006.01)
F16D 23/06 (2006.01)
F16D 125/42 (2012.01)
F16D 49/10 (2006.01)

CLEARANCE CONTROL SWASH PLATE DEVICE AND SINGLE-SHAFT TWO-SPEED DRIVE SYSTEM WITH FRICTION CLUTCH APPLIED THERETO

BACKGROUND

1. Technical Field

The present invention relates generally to a clearance control swash plate device for a transmission or reducer and a single-shaft two-speed drive system, including the clearance control swash plate device, with a friction clutch applied thereto, and more particularly to a field in which a technology for implementing reduction via a clearance control swash plate device and planetary gears is applied to vehicles and similar drive systems.

2. Description of the Related Art

Generally, a transmission is installed between a clutch and a drive shaft, and functions to selectively increase and decrease the rotation force of an engine depending on the driving state of a vehicle and to transfer the rotation force to drive wheels.

The synchronizer of a manual transmission includes a main shaft gear configured to be rotated around a main shaft, a hub coupled to the main shaft, a gear cone installed between the main shaft gear and the hub, a sleeve coupled to the hub in a spline manner and configured to move in an axial direction, and a synchronizer ring configured to be engaged with the gear cone during a gear shift and to function as a clutch by means of frictional force.

Synchronization methods can be classified into key-type methods and pin-type methods. Key-type methods are applied to small-sized vehicles, and provide a smooth gear shift sensation during a gear shift. Pin-type methods enable strong synchronization force to be obtained, and thus can be applied to medium- and full-sized vehicles. A pin-type synchronizer is problematic in that a gear shift sensation cannot be smooth because a sleeve should be moved over a ring-shaped synchronizer pin having a height difference and in that a space cannot be efficiently utilized because the pin-type synchronizer occupies a large space for a friction capacity.

To overcome the above problems, Korean Patent No. 1341384 entitled "Assembly Unit including Two Synchronizer Rings" and published on Dec. 9, 2013 discloses an assembly unit including two synchronizer rings.

FIG. 9 is a perspective view showing a conventional synchronizer which improves the gear shift sensation of a pin-type manual transmission. Referring to FIG. 9, the conventional synchronizer includes: a transmitter 5 configured to include one or more fastening openings 3; and first and second synchronizer rings 100 and 110 connected to each other. The two synchronizer rings 100 and 110 are connected to each other through the fastening openings 3. To produce the synchronizer, most parts of the synchronizer rings need to be finished through machining, and a spring, thrust parts 4, two transmission tooth portions 6, and two coupling tooth portions 7 need to be installed in addition to the transmitter 5 and the pair of synchronizer rings 100 and 110. Accordingly, this synchronizer is problematic in that the number of parts and the cost are increased.

Furthermore, a conventional vehicle drive unit includes: a housing configured to surround a motor; a reducer disposed on a separate shaft; and a differential configured to receive the driving force of the reducer. Generally, there are cases where the path of the power transfer of the vehicle drive unit is composed of two shafts. The motor including a rotor and a stator is disposed inside the housing, one end of a first shaft is coupled to the rotor so as to operate in conjunction with the rotor, the other end of the first shaft is coupled to the differential so as to operate in conjunction with the differential on the same axial line, and the differential is connected to the reducer, including a second shaft having a different phase shift. The vehicle drive unit has the structure in which the reducer needs to be separately disposed outside the housing, and thus the vehicle drive unit is disadvantageous in that the space in which the reducer is installed can be limited and overall volume and weight can be increased. Furthermore, the volume and weight of the conventional drive unit are increased due to the structural characteristics of a connection structure configured to connect multiple shafts, and thus the conventional drive unit is problematic in that fuel efficiency is degraded.

To overcome the above problems, Korean Patent No. 1374872 entitled "Drive Unit Device for Electric Vehicle" and published on Mar. 10, 2014 discloses a drive unit device for an electric vehicle. FIG. 10 is a sectional view showing a reduction device which mitigates a conventional problem related to volume, weight, and cost. Referring to FIG. 10, the conventional drive unit includes: a housing 10; a motor unit configured to include a stator 30 fastened to the inner circumference of the housing 10 and adapted such that a coil is wound around the stator 30, and a rotor 20 disposed inside the stator 30 and adapted to be rotated when power is applied to the coil; a first planetary gear set configured to include a first sun gear 70A adapted to be rotated in conjunction with the rotor 20 via a linkage means, a plurality of first planetary gears 60A engaged with the first sun gear 70A and adapted to be rotated in conjunction with the first sun gear 70A, a ring gear 50 adapted to include an internal gear 52 engaged with the first planetary gears 60A, and a first carrier 80A adapted to operate in conjunction with the first planetary gears 60A; and a differential gear unit 90 connected to the first carrier 80A so as to operate in conjunction with the first carrier 80A. In the drive unit device of this patent, a planetary gear set, a motor, and a differential are densely disposed along the same shaft inside a single housing. Accordingly, a limitation related to an installation space can be reduced by decreasing the volume of the device, the number of parts and weight can be reduced, and noise and vibration can be reduced because power transfer and reduction are performed on the single same axial line. However, the drive unit device of this patent is problematic in that only a reduction ratio suitable for the inherent characteristic of the planetary gear set is passively obtained.

To overcome the above problem, Korean Patent No. 0531444 entitled "Synchronizer Ring for Transmission" and published on Nov. 21, 2005 discloses a synchronizer ring for a transmission. FIG. 11 is a perspective view showing a device which mitigates the gear shift problem of a conventional reduction device. Referring to FIG. 11, the synchronizer ring of a conventional synchronizer includes: a spline portion 10 configured to include a plurality of splines 12 formed on the outer circumference thereof in a circumferential direction thereof; and a cylindrical body portion 20 configured such that a plurality of friction protrusions 22 adapted to enable clutch action is formed in a circumferential direction thereof at identical intervals. According to the device of this patent, reduction can be performed on a single axial line. However, the device is problematic in that the transfer of power is stopped during a gear shift.

PRIOR ART DOCUMENTS

Patent Documents (Patent document 1) Korean Patent No. 1374872 entitled "Drive Unit Device for Electric Vehicle" and registered on Mar. 10, 2014

(Patent document 2) Korean Patent No. 0195022 entitled "Drive Device for Electric Vehicle" and registered on Dec. 9, 2013

(Patent document 3) Korean Patent No. 0531444 entitled "Synchronizer Ring for Transmission" and registered on Nov. 21, 2005

SUMMARY

The present invention is intended to obtain two improved reduction ratios through the application of the features of planetary gears and the planetary gear principle via a band brake and disks by using a clearance control swash plate device and a planetary gear set along the same axial line without changing a shaft.

Accordingly, an embodiment of the present invention provides a device that can implement two speeds by using a clearance control swash plate device, a planetary gear set, a reduction set, a pivot gear set, and a disk set using plate disks.

Another embodiment of the present invention provides a device that can implement two speeds by using a clearance control swash plate device, a planetary gear set, a reduction set, a pivot gear set, and a disk set using cone disks.

According to an embodiment of the present invention, there is provided a clearance control swash plate device including:
 an action plate mounted on a power transfer shaft;
 a first thrust bearing disposed on a rear surface of the action plate, and configured to prevent rotation force, received from the action plate, from being transferred;
 a first clearance swash plate disposed on a rear surface of the first thrust bearing;
 a second clearance swash plate disposed on a rear surface of the first clearance swash plate;
 a worm engaged with a worm gear formed on a portion of the outer circumference of the second clearance swash plate;
 a second thrust bearing disposed on a rear surface of the second clearance swash plate, and configured to prevent rotation force, received from the second clearance swash plate, from being transferred; and
 a thrust washer disposed on a rear surface of the second thrust bearing;
 wherein the first clearance swash plate includes a plurality of first swash surfaces configured to protrude from a surface thereof opposite to a surface thereof facing the first thrust bearing and inclined in one circumferential direction thereof;
 wherein the second clearance swash plate includes a plurality of second swash surfaces configured to protrude from a surface thereof coming in contact with the first clearance swash plate and inclined in the other circumferential direction thereof opposite to the one circumferential direction in which the first swash surfaces are inclined;
 wherein the first swash surfaces of the first clearance swash plate and the second swash surfaces of the second clearance swash plate are disposed such that each of the first swash surfaces can come into tight contact with a corresponding one of the second swash surfaces; and
 wherein when the second clearance swash plate is rotated via the worm gear engaged with the rotated worm, the second swash surfaces of the second clearance swash plate push the first swash surfaces of the first clearance swash plate, the first thrust bearing and the action plate are pushed via the first pushed clearance swash plate, the location of the thrust washer is fastened, and the thrust washer sustains repulsive force generated when the second clearance swash plate pushes the first clearance swash plate, thereby fastening the locations of the second clearance swash plate and the second thrust bearing.

According to an embodiment of the present invention, the first clearance swash plate may further include rotation prevention protrusions each formed in a shape, including one or more convex portions, on the outer circumference of the first clearance swash plate so as to prevent the first clearance swash plate from being rotated when being pushed by the rotation of the second clearance swash plate.

According to an embodiment of the present invention, the first or second clearance swash plate may be made of stamped steel.

According to an embodiment of the present invention, the clearance control swash plate device may further include a worm drive motor configured to rotate the worm.

According to an embodiment of the present invention, there is provided a single-shaft two-speed drive system with a friction clutch applied thereto, configured to include the clearance control swash plate device and to perform power transfer and reduction on a single power transfer shaft, the system including:
 a planetary gear set including:
  a sun gear configured to operate in conjunction with a drive motor and to include a plurality of gear teeth formed on the outer circumference thereof;
  a plurality of planetary gears engaged with the sun gear and configured to operate in conjunction with the sun gear; and
  a carrier configured to connect the planetary gears so that the planetary gears operate in conjunction with one another, and coupled to plane disks;
 a reduction set including:
  a ring gear drum configured to include a ring gear engaged with the planetary gears of the planetary gear set and formed along the inner circumference thereof;
  a band brake provided on the outer circumference of the ring gear drum; and
  a disk housing configured to have a diameter larger than that of the ring gear drum, to extend from one end of the ring gear drum, and to include grooves coupled to a plurality of clutch disks and formed in the inner circumference thereof;
 a disk set configured such that the plane disks, each including a plurality of teeth formed on the corresponding inner circumference thereof, and the clutch disks, each including a plurality of teeth formed on the corresponding outer circumference thereof, are alternately disposed;
 the clearance control swash plate device disposed on one side of the disk set; and
 a differential located on a remaining side of the clearance control swash plate device, and connected to the carrier so as to operate in conjunction with the carrier;

wherein when the radius of the band brake is increased on the outer circumference of the ring gear drum, the ring gear drum and the ring gear are enabled to be desirably rotated, and the worm is rotated forward by the forward rotation of the worm drive motor, in which case the second clearance swash plate is rotated forward via the worm gear engaged with the worm, the first clearance swash plate coming into tight contact with the second swash surfaces of the second clearance swash plate is pushed by the forward rotation of the second clearance swash plate, the first clearance swash plate pushes the disk set toward the carrier, and the disk set couples the carrier to the ring gear drum, so that the ring gear enabled to be desirably rotated and the planetary gears engaged with the ring gear revolve together and transfer power to the carrier, thereby obtaining a single reduction ratio; and wherein when the radius of the band brake is decreased on the outer circumference of the ring gear drum, the rotation of the ring gear drum and the ring gear is suppressed, and the worm is rotated backward by the backward rotation of the worm drive motor, in which case the second clearance swash plate is rotated backward via the worm gear engaged with the worm, the tight contact state of the first clearance swash plate in which the first clearance swash plate comes into tight contact with the second swash surfaces of the second clearance swash plate is loosened by the backward rotation of the second clearance swash plate, the tight contact state of the disk set in which the disk set is pushed toward the carrier via the first clearance swash plate is loosened, and the carrier is separated from the ring gear drum, so that the planetary gears engaged with the ring gear the rotation of which has been suppressed revolve along with the teeth of the ring gear and transfer power to the carrier, thereby obtaining another reduction ratio.

According to an embodiment of the present invention, the plane or clutch disks may be cone clutches.

According to an embodiment of the present invention, the plane or clutch disks may be plate disks.

According to an embodiment of the present invention, the single-shaft two-speed drive system may further include a pivot gear set including a pivot gear configured such that one side thereof is rotatably connected to the first pivot connection part of the band brake and the other side thereof is rotatably connected to a second pivot connection part installed on a portion of the outer circumference of the second clearance swash plate.

According to an embodiment of the present invention, the second pivot connection part may be rotated by the rotation of the second clearance swash plate, and the pivot gear set may be rotated by the rotation of the second pivot connection part, so that the first pivot connection part is rotated and the radius of the band brake is selectively increased and decreased depending on whether the second clearance swash plate is rotated forward or backward.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION

In the following description of the present invention, a detailed description of a well-known function or component will be omitted when it is determined that the detailed description may make the gist of the present invention obscure. The terms used herein are terms that are defined by taking into account the functions thereof in the present invention. The meanings of the terms may vary depending on a user's intention, an operator's intention, practice or the like. Therefore, the terms should be defined based on the overall content of the specification.

A clearance control swash plate device and a single-shaft two-speed drive system, including the clearance control swash plate device, with a friction clutch applied thereto will be described below. The terms used herein to refer to the components of the clearance control swash plate device and the single-shaft two-speed drive system, including the clearance control swash plate device, with a friction clutch applied thereto, and the terms used herein to describe driving characteristics are adopted for ease of description. Accordingly, the present invention is not limited to the terms used herein, and other terms that refer to objects having equivalent technical meanings may be used.

Figure 1:
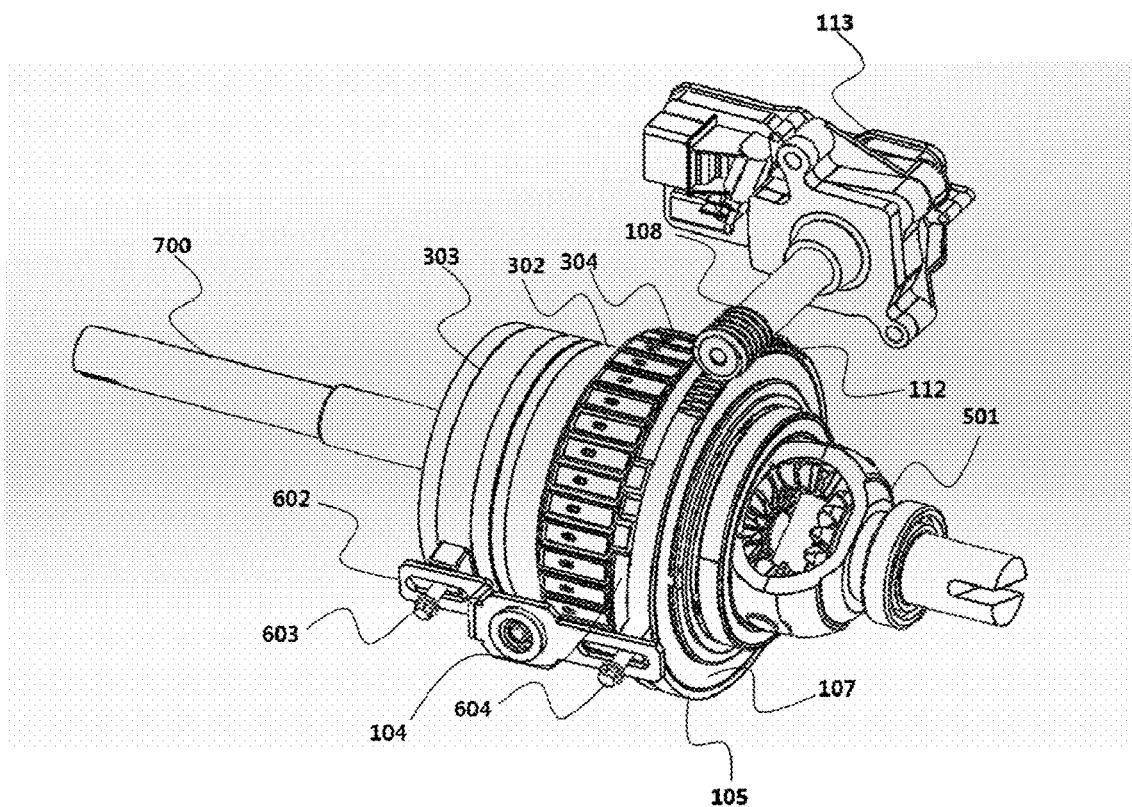
FIG. 1 is a perspective view showing a clearance control swash plate device and a single-shaft two-speed drive system with a friction clutch applied thereto according to an embodiment of the present invention.

FIG. 1 is a perspective view showing a clearance control swash plate device and a single-shaft two-speed drive system with a friction clutch applied thereto according to an embodiment of the present invention.

Referring to FIG. 1, the single-shaft two-speed drive system with a friction clutch applied thereto may enable power transfer and reduction to be performed on a single power transfer shaft 700, and a band brake 303 may be disposed on a ring gear drum 302.

A ring gear 305 may be formed on the inner circumference of the ring gear drum 302, and a disk housing 304 may be formed on one side of the ring gear drum 302 to have a diameter larger than that of the ring gear drum 302. The disk housing 304 may have a diameter larger than that of the ring gear drum 302, and may extend from one end of the ring gear drum 302. Grooves configured to couple a plurality of clutch disks 403 together may be formed in the inner circumference of the disk housing 304. The disk housing 304 may be configured such that a plurality of plane disks 402 and the plurality of clutch disks 403 are alternately disposed inside the disk housing 304.

The clearance control swash plate device may include: an action plate 102; a first thrust bearing 103; a first clearance swash plate 104 configured such that first swash surfaces 109 are formed on one surface thereof; a second clearance swash plate 105 configured to include a worm gear 112 formed on one side thereof, and configured such that second swash surfaces 111 are formed on one surface thereof; a second thrust bearing 106; a thrust washer 107; a worm 108; and a worm drive motor 113. The action plate 102 may be disposed on one surface of a disk set 401 composed of the pluralities of plane disks 402 and clutch disks 403 inside the disk housing 304. The clearance control swash plate device may be configured such that the action plate 102, the first thrust bearing 103, the first and second clearance swash plates 104 and 105, the second thrust bearing 106, and the thrust washer 107 are disposed in parallel on the power transfer shaft.

A pivot gear set 601 may include a pivot gear 602, a first pivot connection part 603, and a second pivot connection part 604. The first pivot connection part 603 may be formed on one side of the band brake 303, and the second pivot connection part 604 may be formed on a portion of the outer circumference of the second clearance swash plate 105. The first and second pivot connection parts 603 and 604 may be formed in the shapes of bolts, cylinders, or the like, and may be coupled to the pivot gear 602 so as to operate in conjunction with the pivot gear 602. A part of the pivot gear 602 may be rotatably fastened, and the pivot gear 602 may be connected to the first and second pivot connection parts 603 and 604 so that the pivot gear 602 can increase the radius of the band brake 303 in such a manner as to be rotated when the second clearance swash plate 105 is rotated via the worm 108 and pushes the first clearance swash plate 104 toward the disk set 401. The pivot gear 602 can decrease the radius of the band brake 303 when the second clearance swash plate 105 returns to a state before the rotation. Since the method or principle by which the band brake 303 and the pivot gear 601 operate in conjunction with each other corresponds to a well-known technology, a detailed description thereof is omitted.

Figure 2:
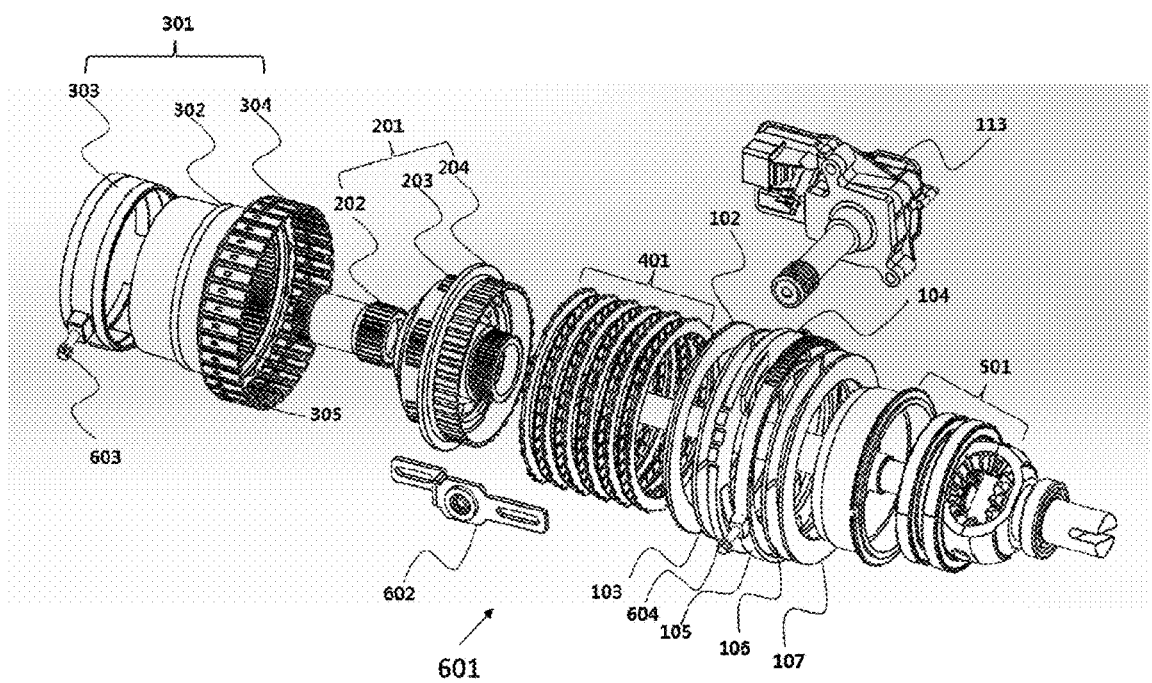
FIG. 2 is a perspective view schematically showing the structures of the clearance control swash plate device and the single-shaft two-speed drive system with a friction clutch applied thereto according to the embodiment of the present invention.

FIG. 2 is a perspective view schematically showing the structures of the clearance control swash plate device and the single-shaft two-speed drive system with a friction clutch applied thereto according to the embodiment of the present invention.

Referring to FIG. 2, a reduction set 301 may include the ring gear drum 302, the band brake 303, the disk housing 304, and the ring gear 305. The ring gear 305 may be formed along the inner circumference of the ring gear drum 302, and the rotation of the ring gear drum 302 may be suppressed by the band brake 303. The first pivot connection part 603 may be formed on a portion of the outer circumference of the band brake 303. The first pivot connection part 603 may be connected to the pivot gear 602, and may adjust the radius of the band brake 303. Since the band brake 303 corresponds to a well-known technology, a detailed description thereof is omitted. The disk housing 304 may be formed at one end of the ring gear drum 302, and grooves configured to be engaged with a plurality of teeth formed on the outer circumferences of the clutch disks 403 are formed in the inner circumference of the disk housing 304.

A planetary gear set 201 may include a sun gear 202, planetary gears 203, and a carrier 204. The sun gear 202 may receive power, and may transfer the power to a differential 501 via the carrier 204. When the sun gear 202 transfers the power via the carrier 204, the sun gear 202 may rotate the planetary gears 203 engaged therewith, and the ring gear 305, formed along the inner circumference of the ring gear drum 302 the rotation of which has been suppressed by the band brake 303 having a decreased radius, may be engaged with the planetary gears 203. The planetary gears 203, engaged with the ring gear 305 the rotation of which has been suppressed, may revolve along the teeth of the ring gear 305, and may transfer power to the carrier 204, thereby obtaining a single reduction ratio. The carrier 204 may be rotated at a reduction ratio based on the planetary gear principle through the engagement of the sun gear 202, the ring gear 305, and the planetary gears 203.

The disk set 401 may include the pluralities of plane disks 402 and clutch disks 403, and the pluralities of plane disks 402 and clutch disks 403 may be formed in the shapes of plate disks or cone disks. A plurality of teeth may be formed on the inner circumference of each of the plane disks 402, and a plurality of teeth may be formed on the outer circumference of each of the clutch disks 403. The disk set 401 may be configured such that the pluralities of plane disks 402 and clutch disks 403 are alternately disposed. The teeth formed on the inner circumferences of the plane disks 402 may be engaged with a plurality of grooves formed in a portion of the outer circumference of the carrier 204, may be moved along the grooves, and may prevent the plane disks 402 from being rotated. The teeth formed on the outer circumferences of the clutch disks 403 may be engaged with a plurality of grooves formed in the inner circumference of the disk housing 304, may be moved along the grooves, and may prevent the clutch disks 403 from being rotated. Since the plane disks 402 and the clutch disks 403 correspond to well-known technologies, detailed descriptions thereof are omitted.

In the clearance control swash plate device, the worm gear motor 113 may rotate the second clearance swash plate 105. The worm gear 112 may be formed on a portion of the outer circumference of the second clearance swash plate 105, and may be engaged with the worm 108 configured to be rotated via the worm gear motor 113. Since the worm 108 and the worm gear 112 correspond to well-known technologies, detailed descriptions thereof are omitted. The plurality of second swash surfaces 111 configured to protrude from one surface of the second clearance swash plate 105 and inclined in one circumferential direction of the second clearance swash plate 105 may be formed on the second clearance swash plate 105. The second pivot connection part 604 may be formed on a portion of the outer circumference of the second clearance swash plate 105. The second pivot connection part 604 may be rotatably connected to one side of the pivot gear 602, and the pivot gear 602 may be rotated by the rotation of the second clearance swash plate 105. The plurality of first swash surfaces 109 configured to protrude from one surface of the first clearance swash plate 104 and inclined in the other circumferential direction of the first clearance swash plate 104 opposite to the one direction in which the second swash surfaces 111 of the second clearance swash plate 105 are inclined may be formed on the first clearance swash plate 104.

When the second clearance swash plate 105 is rotated, the second swash surfaces 111 may come into tight contact with the first swash surfaces 109 of the first clearance swash plate 104, and may push the first clearance swash plate 104. Rotation prevention protrusions 110, each formed in a shape including one or more convex portions, may be formed on the outer circumference of the first clearance swash plate 104 so as to prevent the first clearance swash plate 104 from being rotated when being pushed by the rotation of the second clearance swash plate 105.

The first clearance swash plate 104 may transfer power, generated when the first clearance swash plate 104 is pushed via the second clearance swash plate 105, to the first thrust bearing 103 and the action plate 102. Accordingly, the action plate 102 may come into tight contact with the disk set 401 due to the received power, thereby bringing the plane disks 402 and clutch disks 403 of the disk set 401 into tight contact with the carrier 204.

Since the differential 501 corresponds to a well-known technology, a detailed description thereof is omitted.

Figure 3:
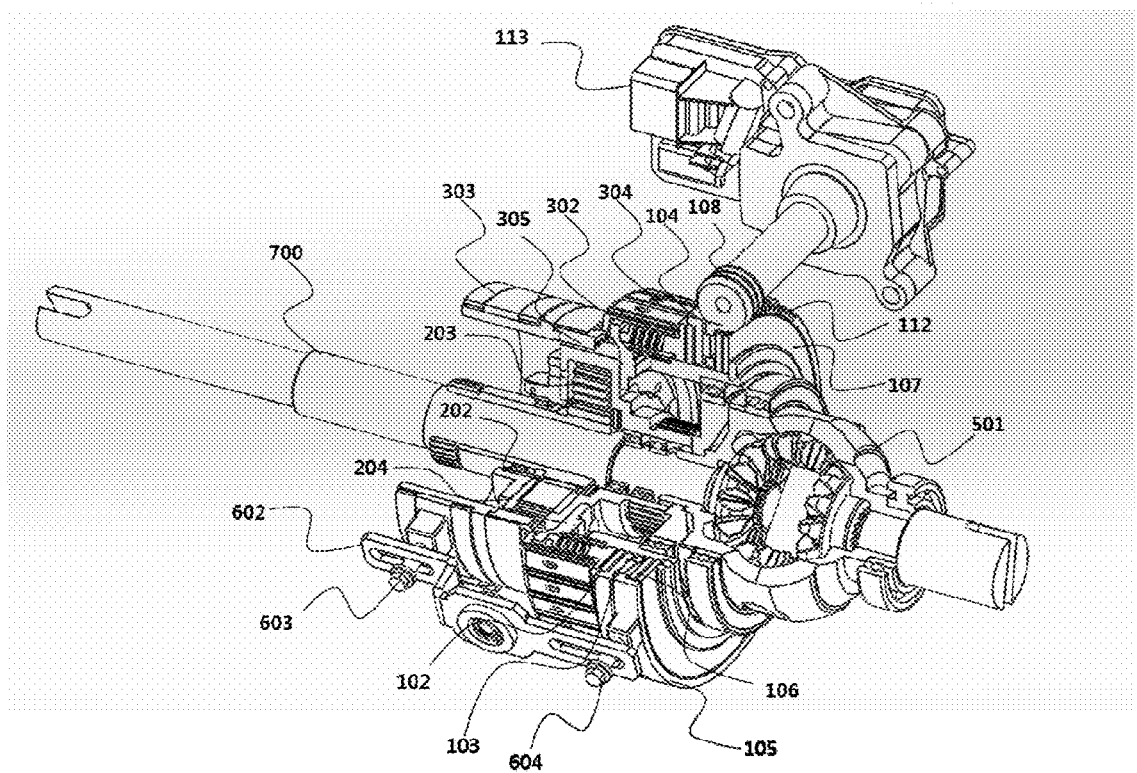
FIG. 3 is a partially cutaway view showing the clearance control swash plate device and the single-shaft two-speed drive system with a friction clutch applied thereto according to the embodiment of the present invention.

FIG. 3 is a partially cutaway view showing the clearance control swash plate device and the single-shaft two-speed drive system with a friction clutch applied thereto according to the embodiment of the present invention.

Referring to FIG. 3, the second clearance swash plate 105 may be selectively rotated forward and backward via the worm 108 rotated by the worm gear motor 113 and the worm gear 112 engaged with the worm 108. Furthermore, the rotation of the second clearance swash plate 105 may stop when being sufficiently spaced apart from the first clearance swash plate 104. The second clearance swash plate 105 rotated by the worm gear 112 may selectively rotate the pivot gear 602 forward and backward via the second pivot connection part 604 formed on a portion of the outer circumference thereof, thereby selectively increasing and decreasing the radius of the band brake 303.

When the radius of the band brake 303 is increased, the ring gear 305 formed along the inner circumference of the ring gear drum 302 may be released from the suppression of the band brake 303 and may be desirably rotated. Furthermore, the worm 108 may be rotated forward by the forward rotation of the worm drive motor 113. Accordingly, the second clearance swash plate 105 may be rotated forward via the worm gear 112 engaged with the worm 108, and the first clearance swash plate 104, coming into tight contact with the second swash surfaces 111 of the second clearance swash plate 105, may be pushed by the forward rotation of the second clearance swash plate 105. Furthermore, the first thrust bearing 103, coming into tight contact with the first clearance swash plate 104, and the action plate 102 may be pushed, and the disk set 401, i.e., the plane disks 402 and the clutch disks 403, may be pushed toward the carrier 204. The plane disks 402 and clutch disks 403 of the disk set 401 may suppress the rotation of one another when coming into tight contact with one another. Furthermore, the plane disks 402 and clutch disks 403 of the disk set 401 coming into tight contact with one another may couple the ring gear drum 302, the disk housing 304, and the carrier 204 together, and may rotate the ring gear drum 302, the disk housing 304, and the carrier 204.

The rotation force of the sun gear 202 may be transferred to the differential 501 via the ring gear drum 302 and the carrier 204 coupled together.

Accordingly, when the second clearance swash plate 105 pushes the first clearance swash plate 104 and the ring gear drum 302 and the carrier 204 are coupled together and rotated in the state in which the ring gear drum 302 and the ring gear 305 have been enabled to be desirably rotated by increasing the radius of the band brake 303 on the outer circumference of the ring gear drum 302, the number of revolutions of the carrier 204 may be identical to the number of revolutions of the sun gear 202.

This is represented by the following equation:

$$\text{Number of teeth } Z_S \text{ of sun gear} \times \text{Number of revolutions } N_S \text{ of sun gear} + \text{Number of teeth } Z_R \text{ of ring gear} \times \text{Number of revolutions } N_R \text{ of ring gear} = (\text{Number of teeth } Z_S \text{ of sun gear} + \text{Number of teeth } Z_R \text{ of ring gear}) \times \text{Number of revolutions } N_C \text{ of carrier} \quad (1)$$

When the number of revolutions $N_R$ of the ring gear 305 is substituted for the number of revolutions $N_C$ of the carrier 204 so as to make the number of revolutions $N_R$ of the ring gear 305 identical to the number of revolutions $N_C$ of the carrier 204 and the equation is rearranged, the following equation is obtained:

$$\text{Number of revolutions } N_S \text{ of sun gear} = \text{Number of revolutions } N_C \text{ of carrier} \quad (2)$$

When the radius of the band brake 303 is decreased on the outer circumference of the ring gear drum 302, the rotation of the ring gear drum 302 and the ring gear 305 may be suppressed. Furthermore, the worm 108 may be rotated backward by the backward rotation of the worm drive motor 113. Accordingly, the second clearance swash plate 105 may be rotated backward via the worm gear 112 engaged with the worm 108, and the tight contact state of the first clearance swash plate 104, in which the first clearance swash plate 104 has come into tight contact with the second swash surfaces 111 of the second clearance swash plate 105, may be loosened by the backward rotation of the second clearance swash plate 105, thereby loosing the tight contact state of the disk set 401 in which the disk set 401 has been pushed toward the carrier 204 by the first clearance swash plate 104. When the tight contact state of the disk set 401 is loosened, the carrier 204 may be separated from the ring gear drum 302.

The sun gear 202 having received power may be engaged with the planetary gears 203, and may rotate the planetary gears 203. The planetary gears 203 may revolve along the teeth of the ring gear 305, and the carrier 204 coupled to the planetary gears 203 may receive reduced rotation force. The plane disks 402 and clutch disks 403 of the disk set 401 may be spaced apart from one another, and the plane disks 402 engaged with the grooves of the carrier 204 may be rotated along with the carrier 204. The carrier 204 may transfer the reduced rotation force to the differential 501.

Accordingly, in the state in which the radius of the band brake 303 has been decreased on the outer circumference of the ring gear drum 302 and the rotation of the ring gear drum 302 and the ring gear 305 has been suppressed, when the worm 108 is rotated backward by the backward rotation of the worm drive motor 113, the second clearance swash plate 105 may be rotated backward via the worm gear 112 engaged with the worm 108, and the tight contact state of the first clearance swash plate 104, in which the first clearance swash plate 104 has come into tight contact with the second swash surfaces 111 of the second clearance swash plate 105, may be loosened by the backward rotation of the second clearance swash plate 105, thereby loosing the tight contact state of the disk set 401, in which the disk set 401 has been pushed toward the carrier 204 via the first clearance swash plate 104, and separating the carrier 204 from the ring gear drum 302. Accordingly, when the planetary gears 203, engaged with the ring gear 305 the rotation of which has been suppressed, revolve along the teeth of the ring gear 305 and transfer power to the carrier 204, the number of revolutions of the carrier 204 may be generally reduced at a ratio of 3:1 to 4:1 with respect to the number of revolutions of the sun gear 202.

This is represented using the following equation:

$$\text{Number of teeth } Z_S \text{ of sun gear} \times \text{Number of revolutions } N_S \text{ of sun gear} + \text{Number of teeth } Z_R \text{ of ring gear} \times \text{Number of revolutions } N_R \text{ of ring gear} = \\ (\text{Number of teeth } Z_S \text{ of sun gear} + \text{Number of teeth } Z_R \text{ of ring gear}) \times \\ \text{Number of revolutions } N_C \text{ of carrier} \quad (3)$$

When 0 is substituted for the number of revolutions $N_R$ of the ring gear 305 and the equation is rearranged, the following equation is obtained:

$$\text{Number of revolutions } N_C \text{ of carrier} = \\ \frac{\text{Number of teeth } Z_S \text{ of sun gear}}{\text{Number of teeth } Z_S \text{ of sun gear} + \text{Number of teeth } Z_R \text{ of ring gear}} \times \\ \text{Number of revolutions } N_S \text{ of sun gear} \quad (4)$$

In Equation 4, for example, when 30 and 60 are substituted for the number of teeth $Z_S$ of the sun gear 202 and the number of teeth $Z_R$ of the ring gear 305, respectively, the number of revolutions $N_C$ of the carrier 204 becomes ⅓ of the number of revolutions $N_S$ of the sun gear 202. When the number of teeth $Z_S$ of the sun gear 202 is made different from the number of teeth $Z_R$ of the ring gear 305, an appropriate reduction ratio may be formed. Generally, the number of revolutions $N_C$ of the carrier 204 is reduced at a ratio of 3:1 to 4:1 with respect to the number of revolutions $N_S$ of the sun gear 202.

Figure 4:
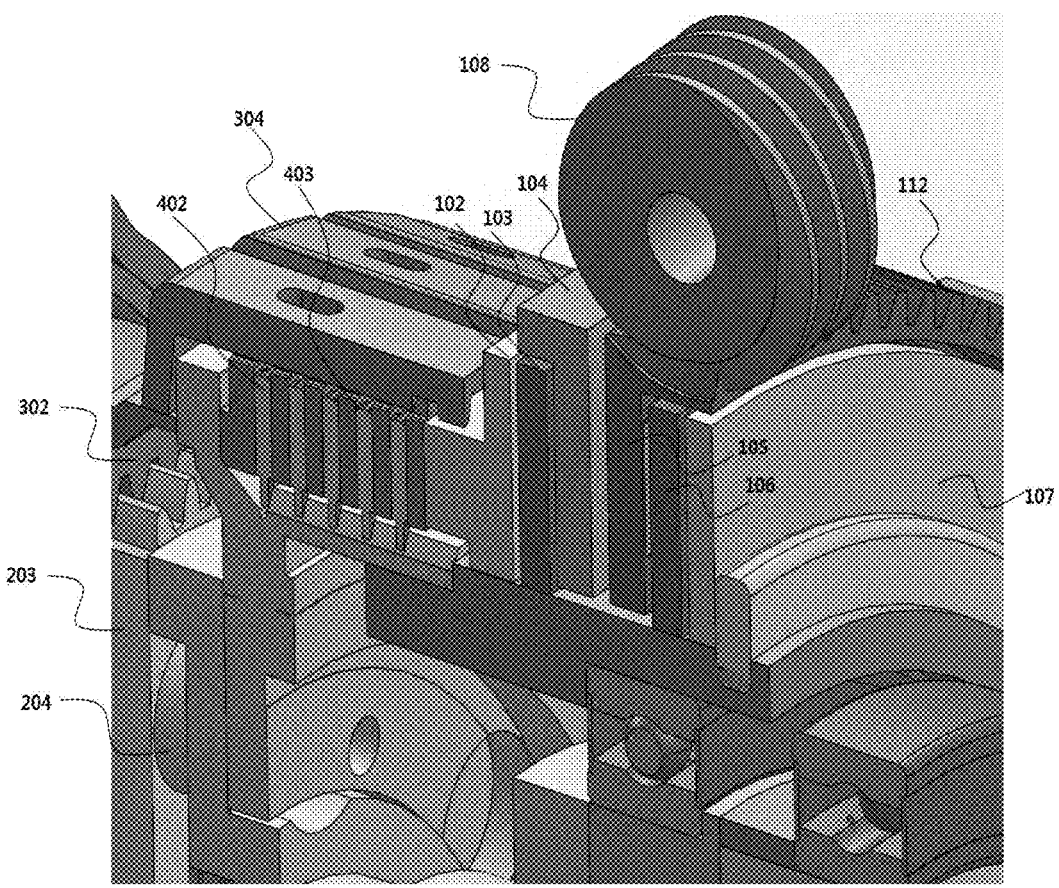
FIG. 4 is a partially cutaway view showing the clearance control swash plate device according to the embodiment of the present invention in the state in which a second clearance swash plate has been rotated.

FIG. 4 is a partially cutaway view showing the clearance control swash plate device according to the embodiment of the present invention in the state in which the second clearance swash plate 105 has been rotated.

Referring to FIG. 4, the second clearance swash plate 105 may be rotated via the worm gear 112 formed on a portion of the outer circumference of the second clearance swash plate 105, and may push the first clearance swash plate 104 due to the rotation thereof. Accordingly, the first and second clearance swash plates 104 and 105 may be spaced apart from each other. Furthermore, the first pushed clearance swash plate 104 may bring the first thrust bearing 103, the action plate 102, and the disk set 401 into tight contact with one another. The action plate 102 may transfer rotation force, generated when the action plate 102 comes into tight contact with the first thrust bearing 103 and the disk set 401, and rotation force, generated when the carrier 204 and the ring gear drum 302 are coupled together and rotated, to the first thrust bearing 103. Furthermore, the first thrust bearing 103 may prevent the rotation force from being transferred to the first clearance swash plate 104 by absorbing the rotation force. The second thrust bearing 106 may prevent rotation force, generated when the second clearance swash plate 105 is rotated by the worm 108, from being transferred to the thrust washer 107 by absorbing the rotation force. The thrust washer 107 may sustain repulsive force generated when the first clearance swash plate 104 is pushed by the rotation of the second clearance swash plate 105.

Figure 5:
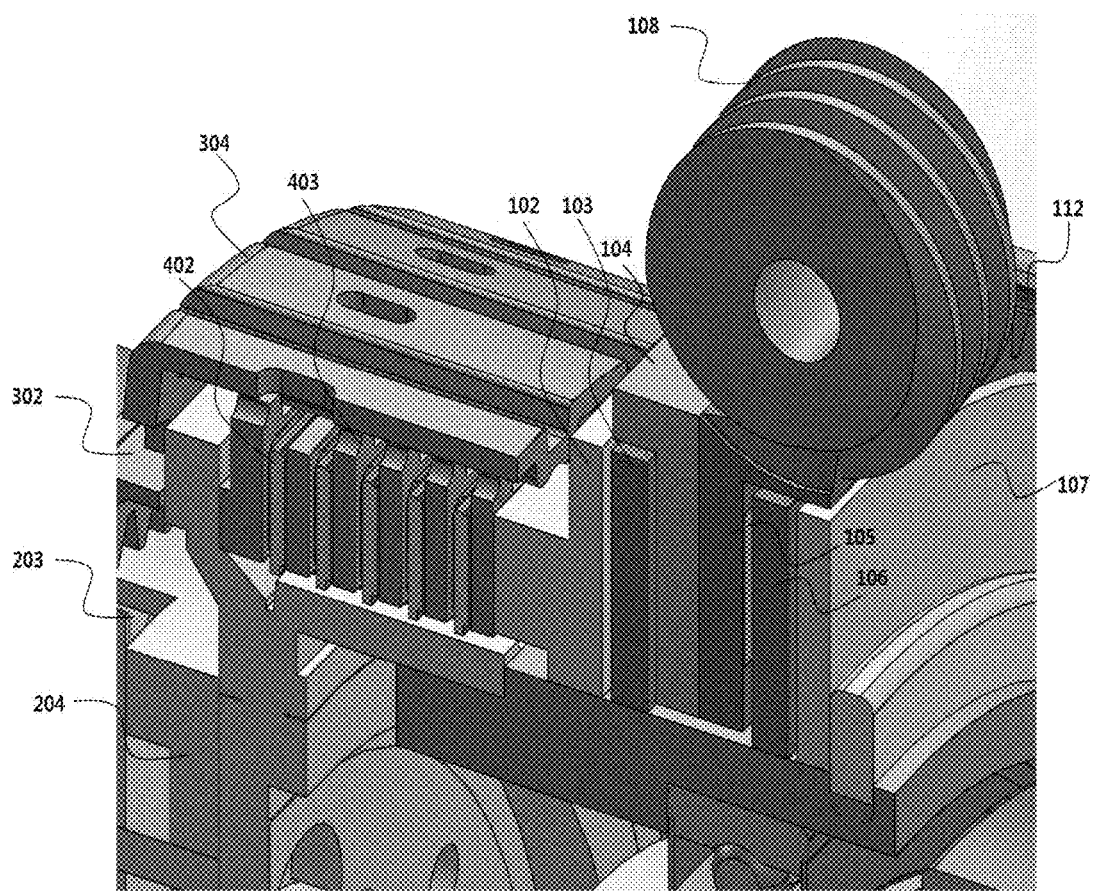
FIG. 5 is a partially cutaway view showing the clearance control swash plate device according to the embodiment of the present invention in the state in which a first clearance swash plate and the second clearance swash plate have come into tight contact with each other.

FIG. 5 is a partially cutaway view showing the clearance control swash plate device according to the embodiment of the present invention in the state in which the first and second clearance swash plates 104 and 105 have come into tight contact with each other.

Referring to FIG. 5, the second clearance swash plate 105 may come into tight contact with the first clearance swash plate 104 before the worm 108 is rotated backward. The pluralities of plane disks 402 and clutch disks 403 of the disk set 401 may be spaced apart from one another, and the plurality of plane disks 402 may be coupled to the carrier 204 and rotated.

Figure 6:
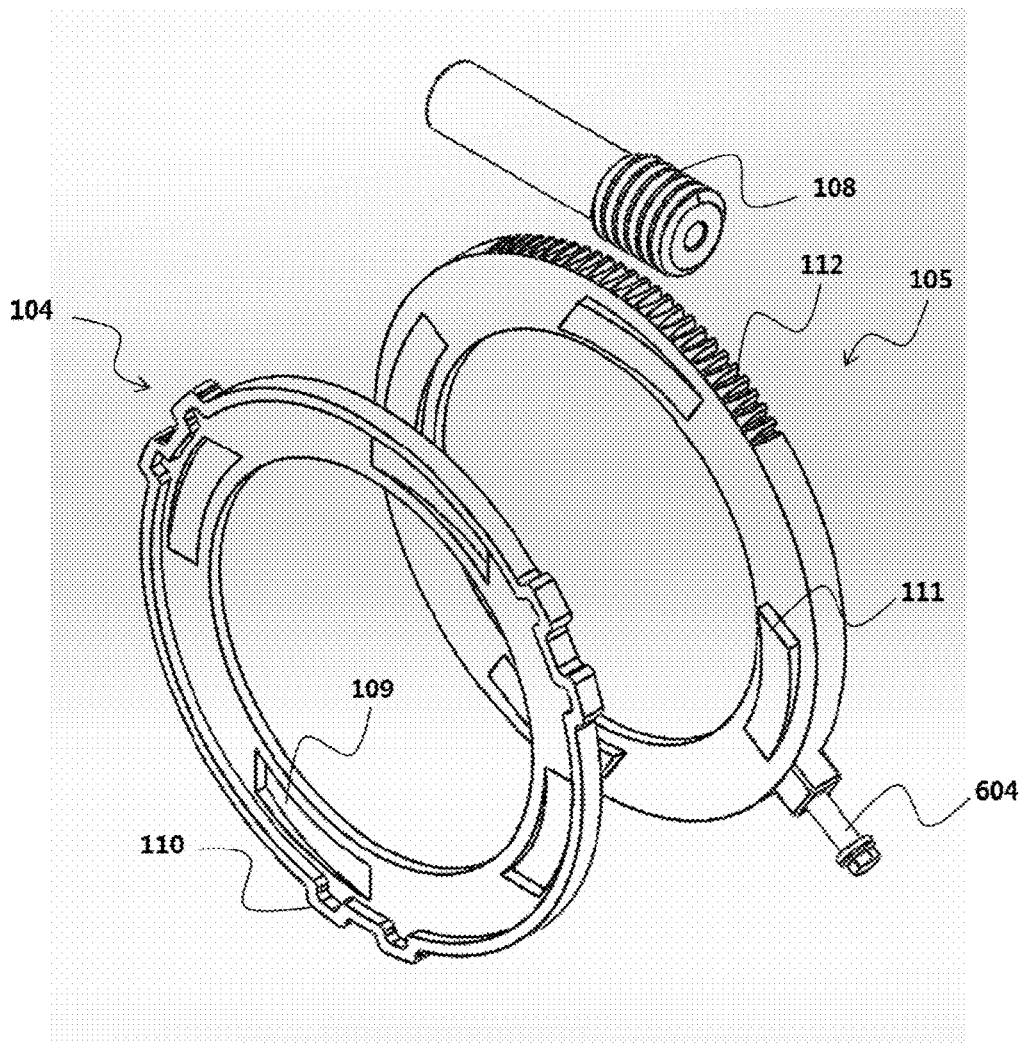
FIG. 6 is a perspective view showing the first and second clearance swash plates and a worm according to the embodiment of the present invention.

FIG. 6 is a perspective view showing the first and second clearance swash plates 104 and 105 and the worm 108 according to the embodiment of the present invention.

Referring to FIG. 6, the worm gear 112 may be formed on a portion of the outer circumference of the second clearance swash plate 105, and may be engaged with the worm 108. The plurality of second swash surfaces 111 configured to protrude from one surface of the second clearance swash plate 105 and inclined in one circumferential direction of the second clearance swash plate 105 may be formed on the second clearance swash plate 105, and the second clearance swash plate 105 may be made of stamped steel. The first swash surfaces 109, configured to protrude from one surface of the first clearance swash plate 104 facing the second clearance swash plate 105 and inclined in the other circumferential direction of the first clearance swash plate 104 opposite to the one direction in which the second swash surfaces 111 of the second clearance swash plate 105 are inclined, may be formed on the first clearance swash plate 104. The rotation prevention protrusions 110 each formed in a shape including one or more convex portions may be formed on the outer circumference of the first clearance swash plate 104, and may prevent the first clearance swash plate 104 from being rotated along with the second clearance swash plate 105 when the second clearance swash plate 105 is rotated. The second pivot connection part 604 formed on a portion of the outer circumference of the second clearance swash plate 105 may be formed on the second clearance swash plate 105.

Figure 7:
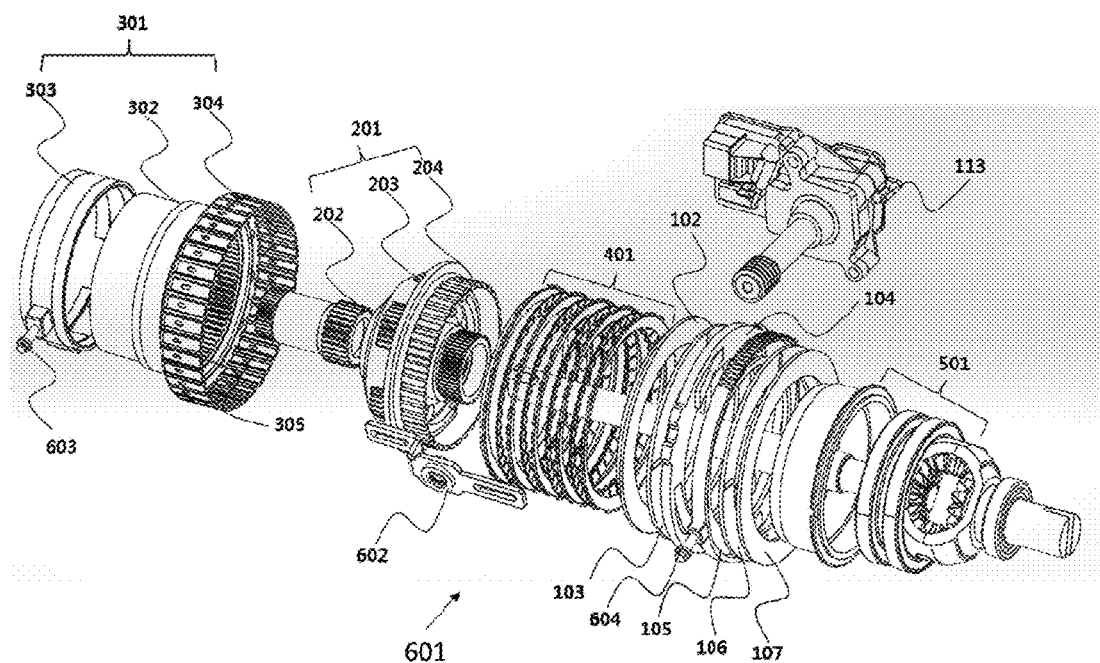
FIG. 7 is a perspective view schematically showing the structures of a clearance control swash plate device and a single-shaft two-speed drive system with a friction clutch applied thereto according to another embodiment of the present invention.

FIG. 7 is a perspective view showing the structures of a clearance control swash plate device and a single-shaft two-speed drive system with a friction clutch applied thereto according to another embodiment of the present invention.

Referring to FIG. 7, the plane disks 402 and clutch disks 403 of a disk set 401 may be cone clutches. Since the cone clutch corresponds to a well-known technology, a detail description thereof is omitted.

Figure 8:
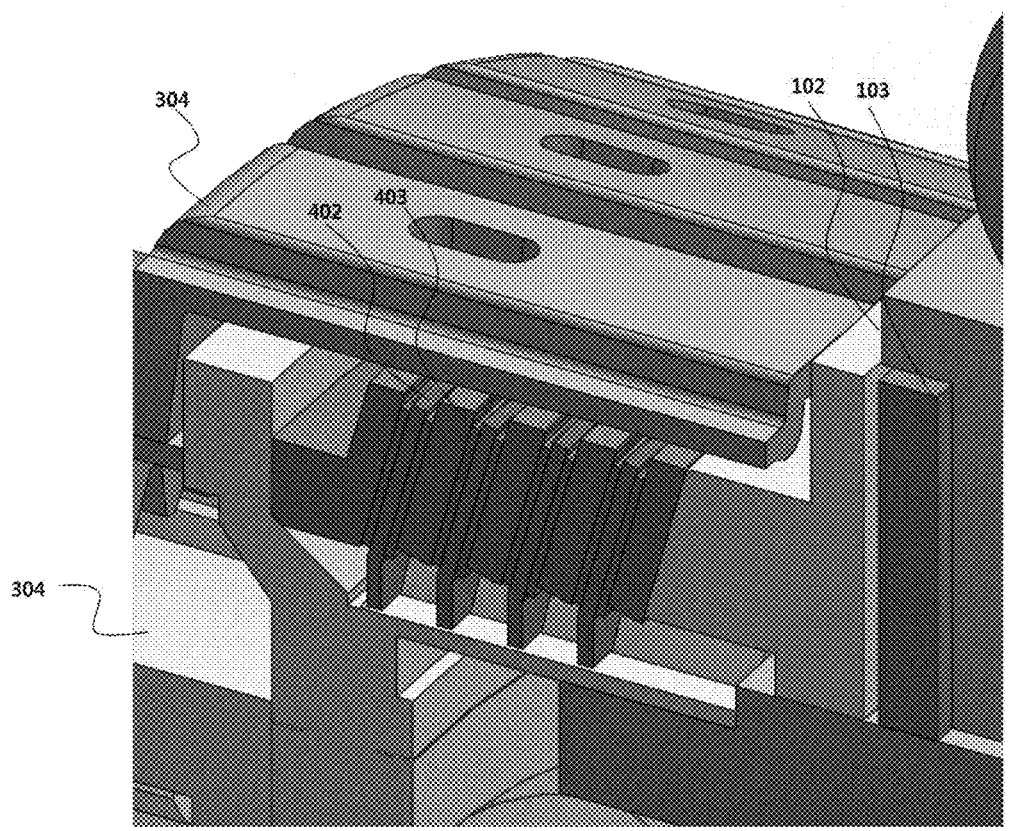
FIG. 8 is a partially cutaway view showing a disk set and the clearance control swash plate device according to the other embodiment of the present invention.
Figure 9:
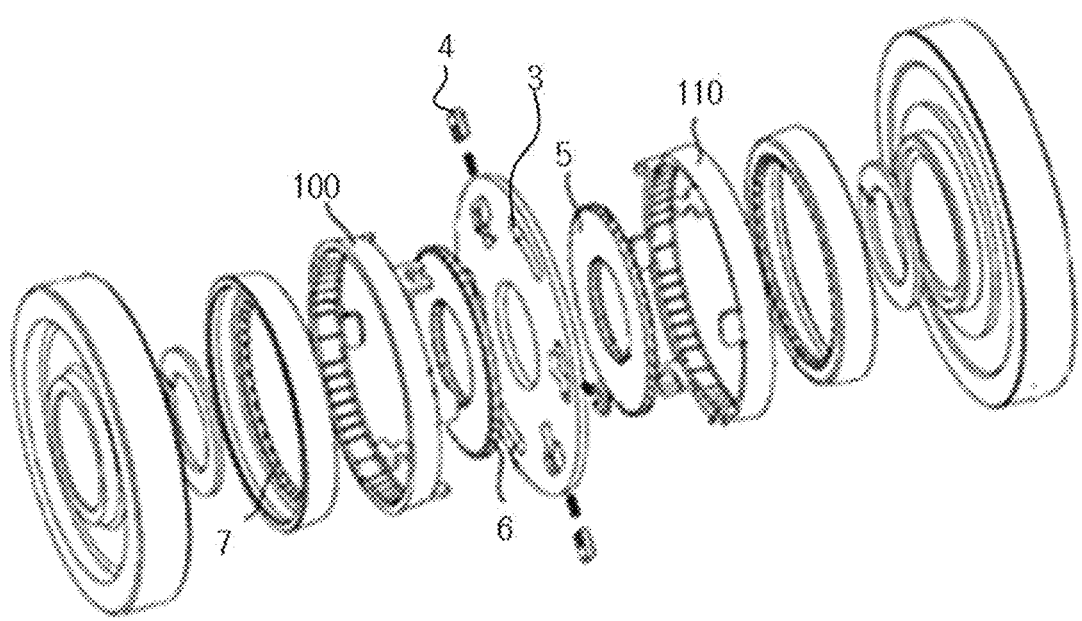
FIG. 9 is a perspective view showing a conventional synchronizer which improves the gear shift sensation of a pin-type manual transmission.
Figure 10:
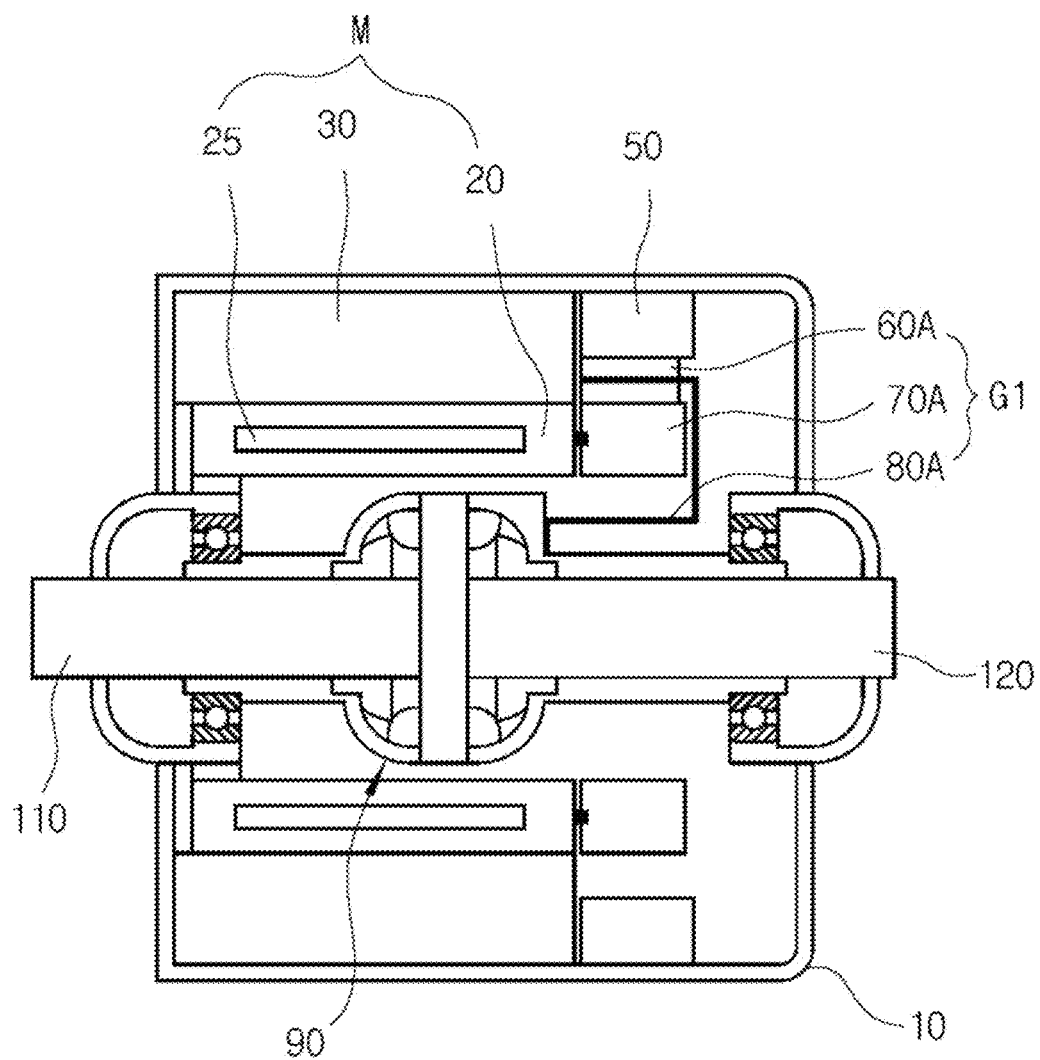
FIG. 10 is a sectional view showing a reduction device which mitigates a conventional problem related to volume, weight, and cost.
Figure 11:
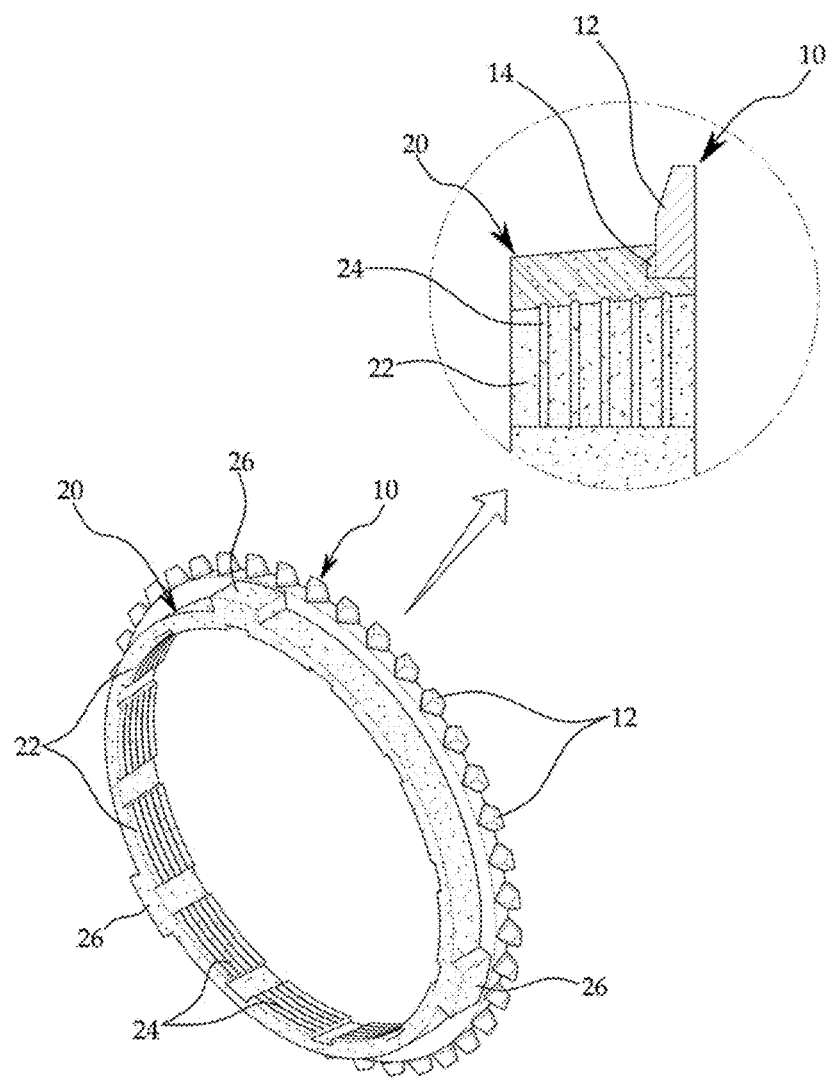
FIG. 11 is a perspective view showing a device which mitigates the gear shift problem of a conventional reduction device.

FIG. 8 is a partially cutaway view showing the disk set and the clearance control swash plate device according to the other embodiment of the present invention.

As described above, the clearance control swash plate device and the single-shaft two-speed drive system with a friction clutch applied thereto according to the present invention are improved over the conventional technologies. The at least one planetary gear set, the reduction set, the disk set, the clearance control swash plate device, the pivot gear set, and the differential are densely disposed on the same axial line. Accordingly, an installation space can be reduced by decreasing the volumes of the clearance control swash plate device and the single-shaft two-speed drive system, efficiency can be improved by reducing the number of parts, costs and weight, noise and vibration can be reduced due to the characteristic in which the power transfer and the gear shift action are performed on the single same axial line, and fuel efficiency can be improved by extending a reduction range. Furthermore, the reduction set and the clearance control swash plate device are provided, thereby achieving the effect of enabling reduction to be actively performed and the effect of overcoming the problem in which generated power is blocked during the reduction.

It will be apparent that the present invention is not limited to the embodiments described in the detailed description but various modifications and changes may be made within the scope of the present invention. Accordingly, the modifications and changes should be considered to fall within the scope of the claims of the present invention and equivalents thereto.

What is claimed is:

1. A clearance control swash plate device comprising:
   an action plate mounted on a power transfer shaft;
   a first thrust bearing disposed on a rear surface of the action plate, and configured to prevent rotation force, received from the action plate, from being transferred;
   a first clearance swash plate disposed on a rear surface of the first thrust bearing;
   a second clearance swash plate disposed on a rear surface of the first clearance swash plate;
   a worm engaged with a worm gear formed on a portion of an outer circumference of the second clearance swash plate;
   a second thrust bearing disposed on a rear surface of the second clearance swash plate, and configured to prevent rotation force, received from the second clearance swash plate, from being transferred; and
   a thrust washer disposed on a rear surface of the second thrust bearing;
   wherein the first clearance swash plate comprises a plurality of first swash surfaces configured to protrude from a surface thereof opposite to a surface thereof facing the first thrust bearing and inclined in one circumferential direction thereof;
   wherein the second clearance swash plate comprises a plurality of second swash surfaces configured to protrude from a surface thereof coming in contact with the first clearance swash plate and inclined in a remaining circumferential direction thereof opposite to the one circumferential direction in which the first swash surfaces are inclined;
   wherein the first swash surfaces of the first clearance swash plate and the second swash surfaces of the second clearance swash plate are disposed such that each of the first swash surfaces can come into contact with a corresponding one of the second swash surfaces; and
   wherein when the second clearance swash plate is rotated via the worm gear engaged with the rotated worm, the second swash surfaces of the second clearance swash plate push the first swash surfaces of the first clearance swash plate, the first thrust bearing and the action plate are pushed via the first pushed clearance swash plate, a location of the thrust washer is fastened, and the thrust washer sustains repulsive force generated when the second clearance swash plate pushes the first clearance swash plate, thereby fastening locations of the second clearance swash plate and the second thrust bearing.

2. The clearance control swash plate device of claim 1 wherein the first clearance swash plate further comprises rotation prevention protrusions each formed in a shape, including one or more convex portions, on an outer circumference of the first clearance swash plate so as to prevent the first clearance swash plate from being rotated when being pushed by the rotation of the second clearance swash plate.

3. The clearance control swash plate device of claim 1 wherein the first or second clearance swash plate is made of stamped steel.

4. The clearance control swash plate device of claim 1 further comprising a worm drive motor configured to rotate the worm.

5. A single-shaft two-speed drive system with a friction clutch applied thereto, the system being configured to enable power transfer and reduction to be performed on a single power transfer shaft, the system comprising:
   a planetary gear set comprising:
      a sun gear configured to operate in conjunction with a drive motor and to comprise a plurality of gear teeth formed on an outer circumference thereof;
      a plurality of planetary gears engaged with the sun gear, and configured to operate in conjunction with the sun gear; and
      a carrier configured to connect the planetary gears so that the planetary gears operate in conjunction with one another, and coupled to plane disks;
   a reduction set comprising:
      a ring gear drum configured to comprise a ring gear engaged with the planetary gears of the planetary gear set and formed along an inner circumference thereof;
      a band brake provided on an outer circumference of the ring gear drum; and
      a disk housing configured to have a diameter larger than that of the ring gear drum, to extend from one end of the ring gear drum, and to comprise grooves coupled to a plurality of clutch disks and formed in an inner circumference thereof;
   a disk set configured such that the plane disks, each comprising a plurality of teeth formed on a corresponding inner circumference thereof, and the clutch disks, each comprising a plurality of teeth formed on a corresponding outer circumference thereof, are alternately disposed;
   the clearance control swash plate device set forth in any one of claims 1 to 4 and disposed on one side of the disk set; and
   a differential located on a remaining side of the clearance control swash plate device, and connected to the carrier so as to operate in conjunction with the carrier;

wherein when a radius of the band brake is increased on the outer circumference of the ring gear drum, the ring gear drum and the ring gear are enabled to be desirably rotated, and the worm is rotated forward by forward rotation of the worm drive motor, in which case the second clearance swash plate is rotated forward via the worm gear engaged with the worm, the first clearance swash plate coming into contact with the second swash surfaces of the second clearance swash plate is pushed by the forward rotation of the second clearance swash plate, the first clearance swash plate pushes the disk set toward the carrier, and the disk set couples the carrier to the ring gear drum, so that the ring gear is enabled to be desirably rotated and the planetary gears engaged with the ring gear revolve together and transfer power to the carrier, thereby obtaining a single reduction ratio; and wherein when the radius of the band brake is decreased on the outer circumference of the ring gear drum, rotation of the ring gear drum and the ring gear is suppressed, and the worm is rotated backward by backward rotation of the worm drive motor, in which case the second clearance swash plate is rotated backward via the worm gear engaged with the worm, a contact state of the first clearance swash plate in which the first clearance swash plate comes into contact with the second swash surfaces of the second clearance swash plate is loosened by the backward rotation of the second clearance swash plate, a contact state of the disk set in which the disk set is pushed toward the carrier via the first clearance swash plate is loosened, and the carrier is separated from the ring gear drum, so that the planetary gears engaged with the ring gear rotation of which has been suppressed revolve along with teeth of the ring gear and transfer power to the carrier, thereby obtaining another reduction ratio.

6. The single-shaft two-speed drive system of claim 5 wherein the plane or clutch disks are cone clutches.

7. The single-shaft two-speed drive system of claim 5 wherein the plane or clutch disks are plate disks.

8. The single-shaft two-speed drive system of claim 5, further comprising a pivot gear set comprising a pivot gear configured such that one side thereof is rotatably connected to a first pivot connection part of the band brake and a remaining side thereof is rotatably connected to a second pivot connection part installed on a portion of the outer circumference of the second clearance swash plate.

9. The single-shaft two-speed drive system of claim 8 wherein the second pivot connection part is rotated by the rotation of the second clearance swash plate, and the pivot gear set is rotated by the rotation of the second pivot connection part, so that the first pivot connection part is rotated and the radius of the band brake is selectively increased and decreased depending on whether the second clearance swash plate is rotated forward or backward.

* * * * *